(12) United States Patent
Rangavajhyala et al.

(10) Patent No.: US 6,808,736 B2
(45) Date of Patent: Oct. 26, 2004

(54) SOY HYDROLYSATE BASED NUTRITIONAL FORMULATIONS

(75) Inventors: Nagendra Rangavajhyala, New Milford, CT (US); Constance L. Whippie, New Milford, CT (US); Chandrasekhara R. Mallangi, New Milford, CT (US); Steven Kwon, Pasadena, CA (US)

(73) Assignee: Nestec S.A., Vevey (CH)

( * ) Notice: Subject to any disclaimer, the term of this patent is extended or adjusted under 35 U.S.C. 154(b) by 255 days.

(21) Appl. No.: 09/681,799

(22) Filed: Jun. 7, 2001

(65) Prior Publication Data

US 2003/0017232 A1 Jan. 23, 2003

(51) Int. Cl.⁷ .................................................. A23L 2/38
(52) U.S. Cl. ...................... 426/598; 426/656; 426/801; 426/661
(58) Field of Search ................................ 426/587, 656, 426/658, 456, 661, 72, 74

(56) References Cited

U.S. PATENT DOCUMENTS

| | | | |
|---|---|---|---|
| 4,906,482 A | * | 3/1990 | Zemel et al. ................. 426/74 |
| 5,416,077 A | * | 5/1995 | Hwang et al. ................ 514/54 |
| 5,514,655 A | * | 5/1996 | DeWille et al. .............. 514/21 |
| 5,547,927 A | * | 8/1996 | Cope et al. .................... 514/2 |
| 5,565,225 A | * | 10/1996 | Johnston ......................... 426/2 |
| 5,777,080 A | * | 7/1998 | Boatright ................... 530/378 |
| 5,998,363 A | * | 12/1999 | Forse et al. .................... 514/2 |
| 6,017,550 A | | 1/2000 | Berk et al. |
| 6,022,702 A | * | 2/2000 | Tsumura et al. ........... 435/68.1 |
| 6,077,558 A | * | 6/2000 | Euber ......................... 426/601 |
| 6,099,871 A | * | 8/2000 | Martinez ....................... 426/2 |
| 6,241,996 B1 | * | 6/2001 | Hahn .......................... 424/439 |
| 6,313,273 B1 | * | 11/2001 | Thomas et al. ............. 530/378 |
| 6,322,846 B1 | * | 11/2001 | Gandhi et al. .............. 426/634 |
| 6,365,218 B1 | * | 4/2002 | Borschel et al. ............ 426/573 |
| 6,436,464 B1 | * | 8/2002 | Euber ......................... 426/654 |
| 6,451,359 B1 | * | 9/2002 | Nsofor ......................... 426/46 |
| 6,511,696 B2 | * | 1/2003 | Gohman et al. ............ 426/601 |
| 2001/0043958 A1 | * | 11/2001 | McEwen et al. ............ 424/757 |
| 2002/0064549 A1 | * | 5/2002 | Shehadeh ................... 424/439 |
| 2002/0176911 A1 | * | 11/2002 | Borschel et al. .............. 426/72 |

FOREIGN PATENT DOCUMENTS

| | | |
|---|---|---|
| DE | 198 56 789 | 6/2000 |
| EP | 1236405 | * 4/2002 |
| GB | 2053228 | * 2/1981 |
| JP | 8-33448 | 2/1996 |
| RU | 1494898 | 12/1989 |
| WO | 94/26129 | 11/1994 |
| WO | WO 94/26129 | * 11/1994 |

OTHER PUBLICATIONS

21 CFR Part 105. Revised as of Apr. 1, 1982, p. 58–61.*
21 Code of Federal Regulations Parts 100–169, Revised as of Apr. 1, 1982 p 59–62.*
21 CFR 105.65–105.66 Infant Foods, Apr. 1, 1982.*

* cited by examiner

Primary Examiner—Carolyn Paden
(74) Attorney, Agent, or Firm—Bell, Boyd & Lloyd LLC

(57) ABSTRACT

Infant formulas and methods of providing nutrition to an infant are provided. The formula includes soy hydrolysate and other nutrients.

28 Claims, No Drawings

SOY HYDROLYSATE BASED NUTRITIONAL FORMULATIONS

BACKGROUND OF THE INVENTION

The present invention relates generally to products for providing nutritional support. More specifically, the present invention relates to infant formulas and other specialized nutritional supplements.

It is of course known to provide enteral nutrition to an individual. Such nutrition can be provided to either afford the complete nutrition requirements to the individual or as a supplement. In a similar vein, these products can either be directed to the population in general or individuals having special requirements. For example, due to disease states or other abnormalities, individuals may not be able to tolerate certain components that may be typical of most nutritional formulations.

One type of enteral nutrition is infant formulas. Infant formulas are designed to provide nutritional support to pre-term, full-term, and post-term babies. Typically, infant formulas are directed to individuals under the age of 12 months. These formulas are either designed as a substitute for or a supplement to human breast milk. Such formulations can provide the total nutritional support for an infant or they can be used to supplement an infant's diet.

Similar to the adult population, some infants are allergic to milk-based products. For example, a number of individuals have an intolerance to regular milk formulas. This is typically due to the proteins and/or lactose in the regular milk formulas. It is therefore known to provide infant formulas based on soy proteins; soy can be used as a substitute for milk.

Additionally, infants do not have fully developed digestive systems. Certain nutritional components, for example, protein, may be difficult for infants to digest during their early development.

SUMMARY OF THE INVENTION

The present invention provides improved nutritional formulations. In a preferred embodiment, the present invention provides an infant formula that is preferably lactose free as well as is designed to be more easily digested by infants.

To this end, in an embodiment, the present invention provides an infant formula that is lactose free comprising hydrolyzed soy protein isolate.

In an embodiment, the soy hydrolysate isolate has a degree of hydrolysis of approximately 4 to about 10%.

In an embodiment, a stabilizer system is provided based on rice starch.

In an embodiment, a stabilizer system is provided based on corn starch.

In an embodiment, the soy hydrolysate isolate comprises not less than 50% by weight of the protein of the formula.

In an embodiment, based on a ready-to-use basis, the formula includes approximately 0.5 to about 5% by weight protein.

In an embodiment based on a ready-to-use basis: the formula includes approximately 0.5% to about 5% by weight protein; approximately 1% to about 10% carbohydrate; and approximately 1% to about 10% fat.

In another embodiment, the present invention provides an infant formula including: a protein source that provides approximately 0.5 to about 10% based on weight of the formula and includes soy hydrolysate isolate; a carbohydrate source; a fat source; a stabilizer system; and vitamins and minerals.

Additionally, in an embodiment, the present invention provides a method of providing an infant formula that is lactose free and more easily digested by an infant than at least some other lactose free infant formulas comprising the steps of using as a protein source soy hydrolysate.

An advantage of the present invention is to provide an improved infant formula.

Another advantage of the present invention is to provide an improved infant formula for infants that is easier to digest.

Still further, an advantage of the present invention is to provide a lactose-free infant formula.

Furthermore, an advantage of the present invention is to provide an infant formula that functions as a comfort product.

Moreover, an advantage of the present invention is to provide an enteral formulation that is more easily digested.

A further advantage of the present invention is to provide a method for providing nutrition to an individual having lactose intolerance.

Additional features and advantages of the present invention will be described in and apparent from the detailed description of the invention.

DETAILED DESCRIPTION OF THE INVENTION

As noted above, in the preferred embodiment set forth below, the present invention provides improved infant formulas and methods for providing nutrition to infants. However, it should be noted, the present invention can be used to construct other dietary supplements for providing enteral nutrition to other individuals requiring lactose free and protein rich supplements that are easy to digest, e.g., adults.

Pursuant to an embodiment of the present invention an infant formula is provided that is lactose free. Thus, the formula can be provided to infants having an intolerance to regular milk formulas. In addition, the formula is designed to provide more easily digestible proteins. Thus, the formula can be used with infants, or other individuals that may have difficulties digesting proteins. For example, the formula can be used with infants that may be fussy due to an intolerance to regular soy protein formulas.

The present invention provides a soy hydrolysate based infant formula. It has been discovered that by providing hydrolyzed soy that a soy-based formula can be provided that is more easily digested and better tolerated and may have at least reduced allergenicity potential.

If desired, soy can comprise all of the protein source of the product. In an embodiment, soy comprises approximately 25% to about 75% by weight of the protein source of the product. In an embodiment, soy comprises up to approximately 50% by weight of the protein component of the formula. In an embodiment, the soy comprises 30% by weight of the total protein of the formula.

A number of soy hydrolysates can be utilized. Preferably, the soy is hydrolyzed to a moderate degree. For example, the hydrolysis, as measured by degree of hydrolysis, is preferably in the range of approximately 4 to about 10% and most preferably approximately 5 to about 8%. With a hydrolysis of, for example, 4 to 7%, it has been found that the cleaving of the soy proteins is sufficient to reduce the majority of whole soy proteins to peptides as determined by gel electrophoresis and peptide profile. Hydrolyzed soy isolate is available from Protein Technologies International (St. Louis, Mo.).

By way of example, and not limitation, embodiments of soy protein hydrolysate profiles are set forth below. Table 1 sets forth the soy protein hydrolysate specifications for an embodiment of the product.

TABLE 1

Soy Protein Hydrolysate Specifications

|  | Per 100 grams |
|---|---|
| Protein Content | 65–90 |
| Fat | 0.5–20 |
| Moisture | 8 maximum |
| Calcium | 0.5–3.0 |
| Phosphorus | 0.5–3.0 |
| Sodium | 2 maximum |
| Potassium | 0.5–3.0 |

Table 2 sets forth an embodiment of the amino acid profile of a preferred soy protein hydrolysate.

TABLE 2

Amino Acid Profile of Soy Protein Hydrolysate

|  | g/100 g |
|---|---|
| Alanine | 4.20 |
| Arginine | 7.70 |
| Aspartic Acid | 11.30 |
| Cysteine | 1.20 |
| Glutamic Acid | 19.00 |
| Glycine | 4.00 |
| Histidine | 2.60 |
| Isoleucine | 4.80 |
| Leucine | 8.00 |
| Lysine | 6.10 |
| Methionine | 1.20 |
| Phenylalanine | 5.30 |
| Proline | 5.70 |
| Serine | 5.20 |
| Threonine | 3.70 |
| Tryptophan | 1.40 |
| Tyrosine | 3.70 |
| Valine | 4.80 |

Table 3 sets forth the molecular weight distribution of a soy hydrolysate that has been found to function satisfactorily.

TABLE 3

Molecular Weight Distribution

| Molecular Weight Distribution Mol. Wt. In Daltons | % Peptides Average | Range |
|---|---|---|
| >50000 | 5 | 4–7 |
| 5000–50000 | 48 | 44–51 |
| 1500–5000 | 25 | 23–27 |
| <500 | 22 | 19–25 |
| Degree of Hydrolysis | 5.5 | 4.0–7.0 |

As noted, the above soy hydrolysate can be either the entire protein source or a protein thereof. The protein source can comprise, in an embodiment approximately 0.5% to about 5% by weight of a ready-to-use formula of the present invention. For a concentrate, this level, in an embodiment of the present invention, would be approximately 1.0 to about 10% by weight of the product.

In view of the soy hydrolysate, one of the issues with respect to the product is providing a stabilizer system. Pursuant to an embodiment of the present invention, neutral rice starch is utilized to stabilize the formula emulsion. Neutral rice starch provides stability as well as better hydration conditions and allows the product to be heat sterilized without degradation. In an embodiment, the stabilizer system is high amylose corn starch, kappa, or iota carragenan. However, it should be noted that a variety of stabilizer systems can be used. Such systems ideally should allow the product to be both aseptic and retort processable.

A number of stabilizer systems have been explored. By way of example, and not limitation, the physical stability of aseptic and retort processed soy hydrolysis-based infant formulas, based on the above soy hydrolysates, at the end of one month are set forth below in Table 4.

TABLE 4

Physical Stability of Aseptic and Retort Processed Soy Hydrolysate Based Infant Formula at the End of One Month

| System | Aseptic Product (Concentrate) | | | Retorted Product (RTF) Phase Separation | | |
|---|---|---|---|---|---|---|
|  | Serum (score 1 (best) - 5) | Cream | Remarks | Top %, phase | Bottom | Remarks |
| 250 PPM kappa-carrageenan | 3 | 3 |  | 64 | 36 |  |
| 250 PPM kappa-carrageenan (higher pre-process temp & time) | 3 | 3 |  | 64 | 36 |  |
| 200 PPM kappa-carrageenan and 100 PPM iota-carrageenan | 3 | 2.5 |  | 41 | 59 |  |
| 2% Modified Starch | 3 | 3 |  | 27 | 73 |  |
| 2% Modified Starch + 200 PPM iota-carrageenan | 25 | 2 |  | 18 | 72 |  |
| 2% Rice Starch + 200 PPM iota-carrageenan | 3 | 3.5 |  | 23 | 77 |  |
| 2% Corn Starch (high amylose) + 200 | 1.75 | 1 | Good | 41 | 59 |  |

TABLE 4-continued

Physical Stability of Aseptic and Retort Processed Soy Hydrolysate Based Infant Formula at the End of One Month

| System | Aseptic Product (Concentrate) | | | Retorted Product (RTF) Phase Separation | | |
|---|---|---|---|---|---|---|
| | Serum (score 1 (best) - 5) | Cream | Remarks | Top %, phase | Bottom | Remarks |
| 2% Corn Starch (high amylose) + 250 PPM iota-carrageenan | 1.25 | 1.5 | Good | 41 | 59 | |
| 1.2% Corn Starch (high amylose) + 100 PPM iota-carrageenan + 150 PPM kappa-carrageenan | 1.25 | 1.5 | Good | Homogeneous | | Good |
| 1.2% Corn Starch (high amylose), 250 PPM iota-carrageenan | 1.25 | 1 | Good | 20 | 80 | Good |
| 2% Corn Starch (high amylose), 250 PPM iota-carrageenan | 1.25 | 1 | Good | 41 | 59 | |
| 1.2% Corn Starch (high amylose), 250 PPM iota-carrageenan | 1.25 | 1.5 | Good | 45 | 55 | |
| 1.2% Corn Starch (high amylose), 100 PPM iota-carrageenan, 150 PPM kappa-carrageenan | 1.25 | 1.5 | Good | 27 | 73 | Good |
| 1.2% Corn Starch (high amylose), 250 PPM kappa-carrageenan | 1.25 | 1.5 | Good | 15 | 85 | Good |

In addition to the protein source and stabilizer, the product will also include necessary macro and micronutrients to provide a complete nutritional product. In an embodiment of the present invention, a ready-to-use product will include approximately 1% to about 15% by weight carbohydrates. As a concentrate, in an embodiment of the present invention, the carbohydrates will comprise approximately 5% to about 20% by weight of the product.

In an embodiment of the present invention, the ready-to-use product will comprise approximately 1% to about 10% by weight fat. In an embodiment of the present invention as a concentrate, the product will comprise approximately 4 to about 20% by weight of fat.

The remaining components of the product will include vitamins and minerals with the majority of the product being water.

Set forth below are tables illustrating ready-to-feed formulas, concentrated infant formulas, and powdered infant formulas. Each of the tables sets forth embodiments of the formulations. In this regard, each of the tables sets forth, embodiments of possible ranges of each of the components.

TABLE 5

Ready-to-Feed Formula

Dry matter basis % by weight

| | Preferable Ranges | | Preferred Ranges | |
|---|---|---|---|---|
| RAW MATERIALS | Upper | Lower | Upper | Lower |
| RO water | | | | |
| Maltrin M-180 | 7.604 | 1.901 | 6.178 | 3.327 |
| Soy hydrolysate isolate | 4.436 | 0.887 | 2.883 | 1.553 |
| Intact Soy Isolate | Up to 50% of total protein | | Up to 30% of total protein | |
| Sucrose | 2.327 | 0.582 | 1.890 | 1.018 |
| Palm Olein oil | 2.226 | 0.557 | 1.809 | 0.974 |
| Soybean oil | 1.247 | 0.312 | 1.013 | 0.545 |
| Coconut oil | 0.980 | 0.245 | 0.796 | 0.429 |
| Corn Starch (High amylose) | 0.885 | 0.221 | 0.719 | 0.387 |

TABLE 5-continued

Ready-to-Feed Formula

Dry matter basis % by weight

| | Preferable Ranges | | Preferred Ranges | |
|---|---|---|---|---|
| RAW MATERIALS | Upper | Lower | Upper | Lower |
| H O Safflower Oil | 0.276 | 0.069 | 0.225 | 0.121 |
| Soy Lecithin 3 FUB | 0.262 | 0.066 | 0.213 | 0.115 |
| Dimodan BPT/K | 0.218 | 0.054 | 0.177 | 0.095 |
| Potassium Chloride | 0.123 | 0.031 | 0.100 | 0.054 |
| Sodium Citrate | 0.111 | 0.028 | 0.091 | 0.049 |
| Calcium Citrate, 4H2O | 0.081 | 0.020 | 0.065 | 0.035 |
| Sodium ascorbate | 0.057 | 0.014 | 0.046 | 0.025 |
| L-Methionine | 0.039 | 0.010 | 0.031 | 0.017 |
| Choline Bitartrate | 0.028 | 0.007 | 0.023 | 0.012 |
| Inositol | 0.023 | 0.006 | 0.019 | 0.010 |
| Magnesium Chloride 6H2O | 0.018 | 0.004 | 0.014 | 0.008 |
| Potassium Citrate | 0.0155 | 0.0039 | 0.0126 | 0.0068 |
| Kappa-Carrageenan | 0.0203 | 0.0027 | 0.0088 | 0.0047 |
| Taurine | 0.0105 | 0.0026 | 0.0085 | 0.0046 |
| Alpha tocopherol acetate | 0.0101 | 0.0025 | 0.0082 | 0.0044 |
| Iota-Carrageenan | 0.0135 | 0.0018 | 0.0059 | 0.0032 |
| Ferrous sulfate | 0.0057 | 0.0014 | 0.0047 | 0.0025 |
| Magnesium Oxide | 0.0051 | 0.0013 | 0.0041 | 0.0022 |
| L-Carnitine | 0.0033 | 0.0008 | 0.0027 | 0.0015 |
| Zinc sulfate | 0.0025 | 0.0006 | 0.0021 | 0.0011 |
| Niacinamide | 0.0025 | 0.0006 | 0.0020 | 0.0011 |
| Vitamin A acetate | 0.0018 | 0.0005 | 0.0015 | 0.0008 |
| Vitamin K1 | 0.001548 | 0.000387 | 0.001258 | 0.000677 |
| Beta carotene | 0.001371 | 0.000343 | 0.001114 | 0.000600 |
| Vit D3 | 0.000912 | 0.000228 | 0.000741 | 0.000399 |
| Pantothenic acid | 0.000844 | 0.000211 | 0.000686 | 0.000369 |
| Potassium iodide | 0.000283 | 0.000071 | 0.000230 | 0.000124 |
| Copper sulfate | 0.000243 | 0.000061 | 0.000198 | 0.000107 |
| Riboflavin | 0.000176 | 0.000044 | 0.000143 | 0.000077 |
| Thiamine hydrochloride | 0.000135 | 0.000034 | 0.000110 | 0.000059 |
| Pyridoxine hydrochloride | 0.000123 | 0.000031 | 0.000100 | 0.000054 |
| Cobalamin | 0.000061 | 0.000015 | 0.000049 | 0.000027 |
| Folic Acid | 0.000035 | 0.000009 | 0.000029 | 0.000015 |
| Biotin | 0.000013 | 0.000003 | 0.000011 | 0.000006 |
| Sodium selenate | 0.000006 | 0.000001 | 0.000005 | 0.000002 |

TABLE 6

Concentrate Infant Formula

| | Dry matter basis % by weight | | | |
|---|---|---|---|---|
| | Preferrable Ranges | | Preferred Ranges | |
| RAW MATERIALS | Upper | Lower | Upper | Lower |
| RO water | | | | |
| Maltrin M-180 | 14.860 | 3.715 | 12.073 | 6.501 |
| Soy hydrolysate isolate | 6.931 | 1.733 | 5.632 | 3.032 |
| Intact Soy Isolate | Up to 50% of total protein | | Up to 30% of total protein | |
| Sucrose | 4.544 | 1.136 | 3.692 | 1.988 |
| Palm Olein oil | 4.348 | 1.087 | 3.533 | 1.902 |
| Soybean oil | 2.435 | 0.609 | 1.978 | 1.065 |
| Coconut oil | 1.913 | 0.478 | 1.554 | 0.837 |
| Corn Starch (High amylose) | 1.728 | 0.432 | 1.404 | 0.756 |
| H O Safflower Oil | 0.540 | 0.135 | 0.439 | 0.236 |
| Soy Lecithin, 3 FUB | 0.512 | 0.128 | 0.416 | 0.224 |
| Dimodan BPT/K | 0.426 | 0.106 | 0.346 | 0.186 |
| Potassium Chloride | 0.240 | 0.060 | 0.195 | 0.105 |
| Sodium Citrate | 0.218 | 0.054 | 0.177 | 0.095 |
| Calcium Citrate, 4H2O | 0.157 | 0.039 | 0.128 | 0.069 |
| Sodium ascorbate | 0.111 | 0.028 | 0.090 | 0.049 |
| L-Methionine | 0.075 | 0.019 | 0.061 | 0.033 |
| Choline Bitartrate | 0.054 | 0.014 | 0.044 | 0.024 |
| Inositol | 0.045 | 0.011 | 0.037 | 0.020 |
| Magnesium Chloride 6H2O | 0.034 | 0.009 | 0.028 | 0.015 |
| Potassium Citrate | 0.0302 | 0.0076 | 0.0246 | 0.0132 |
| Kappa-Carrageenan | 0.0396 | 0.0053 | 0.0172 | 0.0092 |
| Taurine | 0.0204 | 0.0051 | 0.0166 | 0.0089 |
| Alpha tocophenol acetate | 0.0197 | 0.0049 | 0.0160 | 0.0086 |
| Iota-Carrageenan | 0.0264 | 0.0035 | 0.0114 | 0.0062 |
| Ferrous sulfate | 0.0112 | 0.0028 | 0.0091 | 0.0049 |
| Magnesium Oxide | 0.0099 | 0.0025 | 0.0080 | 0.0043 |
| L-Carnitine | 0.0065 | 0.0016 | 0.0053 | 0.0028 |
| Zinc sulfate | 0.0050 | 0.0012 | 0.0040 | 0.0022 |
| Niacinamide | 0.0049 | 0.0012 | 0.0040 | 0.0022 |
| Vitamin A acetate | 0.0035 | 0.0009 | 0.0029 | 0.0015 |
| Vitamin K1 | 0.003024 | 0.000756 | 0.002457 | 0.001323 |
| Beta carotene | 0.002678 | 0.000670 | 0.002176 | 0.001172 |
| Vit D3 | 0.001782 | 0.000446 | 0.001448 | 0.000780 |
| Pantothenic acid | 0.001648 | 0.000412 | 0.001339 | 0.000721 |
| Potassium iodide | 0.000553 | 0.000138 | 0.000449 | 0.000242 |
| Copper sulfate | 0.000475 | 0.000119 | 0.000386 | 0.000208 |
| Riboflavin | 0.000343 | 0.000086 | 0.000279 | 0.000150 |
| Thiamine hydrochloride | 0.000264 | 0.000066 | 0.000214 | 0.000115 |
| Pyridoxine hydrochloride | 0.000240 | 0.000060 | 0.000195 | 0.000105 |
| Cobalamin | 0.000119 | 0.000030 | 0.000097 | 0.000052 |
| Folic Acid | 0.000069 | 0.000017 | 0.000056 | 0.000030 |
| Biotin | 0.000026 | 0.000006 | 0.000021 | 0.000011 |
| Sodium selenate | 0.000011 | 0.000003 | 0.000009 | 0.000005 |

TABLE 7

Powder Infant Formula

| | Dry matter basis % by weight | | | |
|---|---|---|---|---|
| | Preferable Range | | Preferred Range | |
| RAW MATERIALS | Upper | Lower | Upper | Lower |
| Maltnn M-180 | 66.188 | 16.547 | 53.778 | 28.957 |
| Soy hydrolysate isolate | 27.267 | 6.817 | 22.154 | 11.929 |
| Intact Soy Isolate | Up to 50% of total protein | | Up to 30% of total protein | |
| Sucrose | 17.994 | 4.499 | 14.620 | 7.872 |
| Palm Olein Oil | 17.978 | 4.495 | 14.607 | 7.866 |
| Soybean oil | 10.068 | 2.517 | 8.180 | 4.405 |
| Coconut oil | 7.910 | 1.978 | 6.427 | 3.461 |
| H O Safflower Oil | 2.232 | 0.558 | 1.813 | 0.976 |
| Soy Lecithin, 3 FUB | 2.028 | 0.507 | 1.647 | 0.887 |
| Dimodan BPT/K | 0.000 | 0.000 | 0.000 | 0.000 |
| Potassium Chloride | 0.950 | 0.238 | 0.772 | 0.416 |
| Sodium Citrate | 0.862 | 0.215 | 0.700 | 0.377 |
| Calcium Citrate, 4H2O | 0.626 | 0.157 | 0.509 | 0.274 |
| Sodium ascorbate | 0.440 | 0.110 | 0.358 | 0.193 |
| L-Methionine | 0.298 | 0.074 | 0.242 | 0.130 |
| Choline Bitartrate | 0.215 | 0.054 | 0.175 | 0.094 |
| Inositol | 0.180 | 0.045 | 0.146 | 0.079 |
| Magnesium Chloride 6H2O | 0.137 | 0.034 | 0.111 | 0.060 |
| Potassium Citrate | 0.1197 | 0.0299 | 0.0972 | 0.0524 |
| Taurine | 0.0808 | 0.0202 | 0.0657 | 0.0354 |
| Alpha tocopherol acetate | 0.0780 | 0.0195 | 0.0634 | 0.0341 |
| Ferrous sulfate | 0.0444 | 0.0111 | 0.0361 | 0.0194 |
| Magnesium Oxide | 0.0392 | 0.0098 | 0.0318 | 0.0171 |
| L-Carnitine | 0.0257 | 0.0064 | 0.0208 | 0.0112 |
| Zinc sulfate | 0.0197 | 0.0049 | 0.0160 | 0.0086 |
| Niacinamide | 0.0195 | 0.0049 | 0.0158 | 0.0085 |
| Vitamin A acetate | 0.0140 | 0.0035 | 0.0114 | 0.0061 |
| Vitamin K1 | 0.011975 | 0.002994 | 0.009730 | 0.005239 |
| Beta carotene | 0.010606 | 0.002652 | 0.008618 | 0.004640 |
| Vit D3 | 0.007057 | 0.001764 | 0.005734 | 0.003087 |
| Pantothenic acid | 0.006526 | 0.001632 | 0.005303 | 0.002855 |
| Potassium iodide | 0.002190 | 0.000547 | 0.001779 | 0.000958 |
| Copper sulfate | 0.001883 | 0.000471 | 0.001530 | 0.000824 |
| Riboflavin | 0.001360 | 0.000340 | 0.001105 | 0.000595 |
| Thiamine hydrochloride | 0.001044 | 0.000261 | 0.000848 | 0.000457 |
| Pyridoxine hydrochloride | 0.000949 | 0.000237 | 0.000771 | 0.000415 |
| Cobalamin | 0.000470 | 0.000118 | 0.000382 | 0.000206 |
| Folic acid | 0.000274 | 0.000068 | 0.000222 | 0.000120 |
| Biotin | 0.000103 | 0.000026 | 0.000083 | 0.000045 |
| Sodium selenate | 0.000043 | 0.000011 | 0.000035 | 0.000019 |

The present invention provides improved infant formulas. These infant formulas can be utilized either as a supplement to or complete nutrition for the infant. Additionally, as illustrated above, the infant formulas can be provided as a ready-to-use product, a concentrate, or a powder that needs to be reconstituted. The formulas are designed to provide comfort to an infant. As used herein, a comfort formula is one that is more easily digestible for an infant or other individual. Due to the use of hydrolyzed soy, these formulas are easier for infants to digest.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

What is claimed is:

1. An infant formula that is lactose free comprising soy hydrolysate isolate, the soy hydrolysate isolate having a degree of hydrolysis of approximately 4 to about 10% wherein the infant formula further comprises a stabilizer system including rice starch or high amylose corn starch.

2. The infant formula of claim 1 wherein soy hydrolysate isolate comprises not more than 50% by weight of the protein of the formula.

3. The infant formula of claim 1 wherein the formula has a reduced whole soy protein.

4. The infant formula of claim 1 including on a ready-to-use basis approximately 0.5 to about 5% by weight protein.

5. The infant formula of claim 1 including on a ready-to-use basis:
   approximately 0.5% to about 5% by weight protein;
   approximately 1% to about 10% carbohydrate; and
   approximately 1% to about 10% fat.

6. An infant formula including:
   a protein source that provides approximately 0.5 to about 10% based on weight of the formula and includes soy hydrolysate isolate;
   a carbohydrate source;
   a fat source;
   a stabilizer system including high amylose corn starch; and
   vitamins and minerals.

7. The infant formula of claim 6 wherein the carbohydrate source provides approximately 1 to about 20% by weight of the content of the formula.

8. The infant formula of claim 6 wherein the fat source provides approximately 1 to about 20% by weight of the content of the formula.

9. The infant formula of claim 6 wherein the soy hydrolysate isolate has a degree of hydrolysis of approximately 4 to about 10%.

10. The infant formula of claim 6 including a stabilizer system based on rice starch.

11. The infant formula of claim 6 wherein soy hydrolysate isolate comprises not less than 50% by weight of the protein of the formula.

12. The infant formula of claim 6 wherein the formula provides comfort.

13. The infant formula of claim 6 including on a ready-to-use basis approximately 0.5 to about 5% by weight protein.

14. The infant formula of claim 6 including on a ready-to-use basis:
   approximately 0.5% to about 5% by weight protein;
   approximately 1% to about 10% carbohydrate; and
   approximately 1% to about 10% fat.

15. A nutritional formulation including:
   a protein source that provides approximately 0.5 to about 10% based on weight of the formula and includes soy hydrolysate isolate having a degree of hydrolysis of approximately 4 to about 10%;
   a carbohydrate source;
   a fat source;
   a stabilizer system including high amylose corn starch; and
   vitamins and minerals.

16. A method of providing an infant formula that is lactose free and more easily digested by an infant than at least some lactose free infant formulas comprising the steps of using as a protein source soy hydrolysate isolate, the soy hydrolysate isolate having a degree of hydrolysis of approximately 4 to about 10% wherein the infant formula further comprises a stabilizer system including rice starch or high amylose corn starch.

17. The method of claim 16 wherein the formula provides comfort.

18. The method of claim 16 wherein the formula has a reduced soy allergenicity.

19. An infant formula in liquid form including:
   a protein source that provides approximately 0.5 to about 10% based on weight of the formula and includes soy hydrolysate isolate;
   a carbohydrate source;
   a fat source;
   a stabilizer system including high amylose corn starch and carrageenan; and
   vitamins and minerals.

20. The infant formula of claim 19 wherein the carbohydrate source provides approximately 1 to about 20% by weight of the content of the formula.

21. The infant formula of claim 19 wherein the fat source provides approximately 1 to about 20% by weight of the content of the formula.

22. The infant formula of claim 19 wherein the soy hydrolysate isolate has a degree of hydrolysis of approximately 4 to about 10%.

23. The infant formula of claim 19 wherein soy hydrolysate isolate comprises not less than 50% by weight of the protein of the formula.

24. The infant formula of claim 19 including on a ready-to-use basis approximately 0.5 to about 5% by weight protein.

25. The infant formula of claim 19 including on a ready-to-use basis:
   approximately 0.5% to about 5% by weight protein;
   approximately 1% to about 10% carbohydrate; and
   approximately 1% to about 10% fat.

26. An infant formula that is lactose free comprising soy hydrolysate isolate, the soy hydrolysate isolate having a degree of hydrolysis of approximately 4 to about 10%, wherein the infant formula comprises, in percent by weight of total protein, up to 50% of intact soy protein isolate.

27. The infant formula of claim 26 including a stabilizer system based on rice starch.

28. The infant formula of claim 26 including a stabilizer system including high amylose corn starch.

* * * * *